US010180543B2

(12) United States Patent
Yu et al.

(10) Patent No.: US 10,180,543 B2
(45) Date of Patent: Jan. 15, 2019

(54) OPTICAL PATH CONTROL SYSTEM AND OPTICAL MODULE

(71) Applicant: InnoLight Technology (Suzhou) LTD., Suzhou, Jiangsu (CN)

(72) Inventors: Dengqun Yu, Jiangsu (CN); Yuzhou Sun, Jiangsu (CN); Long Chen, Jiangsu (CN); Donghan Wang, Jiangsu (CN); Weilong Li, Jiangsu (CN)

(73) Assignee: InnoLight Technology (Suzhou) Ltd., Suzhou (CN)

( * ) Notice: Subject to any disclaimer, the term of this patent is extended or adjusted under 35 U.S.C. 154(b) by 0 days.

(21) Appl. No.: 15/413,761

(22) Filed: Jan. 24, 2017

(65) Prior Publication Data
US 2017/0227721 A1 Aug. 10, 2017

(30) Foreign Application Priority Data
Feb. 5, 2016 (CN) .......................... 2016 1 0082212

(51) Int. Cl.
| | |
|---|---|
| *G02B 6/42* | (2006.01) |
| *G02B 27/10* | (2006.01) |
| *G02B 6/293* | (2006.01) |
| *H04B 10/11* | (2013.01) |
| *H04B 10/25* | (2013.01) |
| *H04B 10/40* | (2013.01) |

(52) U.S. Cl.
CPC .......... *G02B 6/4206* (2013.01); *G02B 6/2938* (2013.01); *G02B 6/4214* (2013.01); *G02B 6/4246* (2013.01); *G02B 27/1006* (2013.01); *H04B 10/11* (2013.01); *H04B 10/2504* (2013.01); *H04B 10/40* (2013.01)

(58) Field of Classification Search
CPC .. G02B 6/4246; G02B 6/2938; G02B 6/4206; G02B 6/421; G02B 27/1006; G02B 6/4214; H04B 10/40; H04B 10/11; H04B 10/2504
USPC .......... 385/24, 36, 49, 88–93; 398/135–141; 359/640
See application file for complete search history.

(56) References Cited

U.S. PATENT DOCUMENTS

2013/0128365 A1* 5/2013 Von Elm ............ G02B 27/1006
359/640

* cited by examiner

*Primary Examiner* — Michael Mooney
(74) *Attorney, Agent, or Firm* — Finnegan, Henderson, Farabow, Garrett & Dunner, LLP

(57) ABSTRACT

An optical path control system is provided. The optical path control system includes a converging lens used to converge a plurality of light beams passing through the converging lens, and an optical path assembly used to control propagation directions of the plurality of light beams passing through the optical path assembly. When the plurality of light beams pass through the optical path assembly and the converging lens sequentially, the optical path assembly converges the plurality of light beams, and the converging lens converges each of the plurality of light beam into a point of light.

20 Claims, 4 Drawing Sheets

OPTICAL PATH CONTROL SYSTEM AND OPTICAL MODULE

CROSS-REFERENCE TO RELATED APPLICATION

This application is based upon and claims priority to Chinese Patent Application No. 201610082212.8, filed on Feb. 5, 2016, the entire content of which is incorporated herein by reference.

TECHNICAL FIELD

The present disclosure generally relates to the technology field for the manufacture of optical communication elements, and more particularly, to an optical path control system and an optical module.

BACKGROUND

In optical communications, differences in channel spacing for connected optical communication devices frequently requires the light beam spacing to be adjusted to a suitable range before coupling and transmission is carried out. In addition, given the relatively small size of the light passage apertures of photoelectric detectors, it is difficult for all divergent light beams to couple into the photoelectric detectors, resulting in signal loss.

SUMMARY

In one aspect, the present disclosure provides an optical path control system. The optical path control system includes a converging lens used to converge a plurality of light beams passing through the converging lens, and an optical path assembly used to control propagation directions of the plurality of light beams passing through the optical path assembly. When the plurality of light beams pass through the optical path assembly and the converging lens sequentially, the optical path assembly converges the plurality of light beams, and the converging lens converges each of the plurality of light beam into a point of light.

In another aspect, the present disclosure provides an optical module. The optical module includes a case, an optical transceiver interface aligned to an external device, an optical assembly located in the case, and an optical path control system located between the optical assembly and the optical transceiver interface. The optical path control system includes a converging lens used to converge a plurality of light beams passing through the converging lens, and an optical path assembly used to control propagation directions of the plurality of light beams passing through the optical path assembly. When the plurality of light beams pass through the optical path assembly and the converging lens sequentially, the optical path assembly converges the plurality of light beams, and the converging lens converges each of the plurality of light beam into a point of light.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Figure 1:
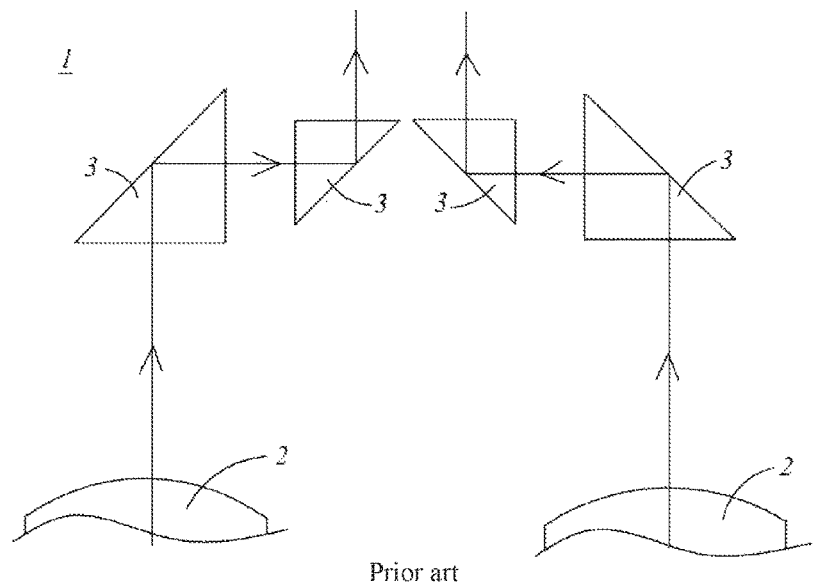
FIG. 1 is a schematic diagram showing an optical path control system according to a conventional technology.

Specific embodiments in this disclosure have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

An optical path control system is provided in the present disclosure, which can reduce the volume of the entire optical path control system and increase the precision of optical path control. The optical path control system comprises a converging lens and an optical path assembly. The converging lens is used to converge light beams which pass through the converging lens, and the optical path assembly is used to control the propagation direction of the light beams which pass through the optical path assembly. When a plurality of incident light beams pass through the optical path assembly and the converging lens sequentially, the optical path assembly converges the incident light beams, and the converging lens converges each incident light beam into a point of light.

In some embodiments, the optical path assembly comprises a plurality of wedge-shaped blocks. When light beams pass through the plurality of wedge-shaped blocks, the light beams change their propagation directions.

In some embodiments, the plurality of wedge-shaped blocks are combined to form a single integrated structure.

In some embodiments, when a plurality of light beams are projected toward the optical path assembly, the plurality of light beams converge between the optical path assembly and the converging lens.

In some embodiments, the plurality of light beams that are projected toward the optical path assembly are parallel.

In some embodiments, the light rays in each light beam of the plurality of light beams are parallel.

In some embodiments, the plurality of light beams converge at the focal point of the converging lens.

In some embodiments, the converging lens converges a plurality of light beams into a plurality of corresponding points of light, and the plurality of corresponding points of light do not overlap.

An optical module is also provided in the present disclosure. The optical module comprises a case, an optical transceiver interface for linking to an external device, and a light transmitting assembly and/or a light receiving assembly located in the case. The optical module further comprises an optical path control system located between the light transmitting assembly and/or light receiving assembly and the optical transceiver interface. The optical path control system comprises the optical path control system mentioned above.

In some embodiments, a wavelength division multiplexing (WDM) device is installed between the optical transceiver interface and the optical path control system. The WDM device is used to join multiple light beams from the optical path control system into a single light beam and transmit the single light beam to the optical transceiver interface, and/or the WDM device is used to dive a light beam from the optical transceiver interface into multiple light beams and transmit the multiple light beams to the optical path control system.

Compared to the conventional technology, the technical solutions provided by the present disclosure adjust the spacing between incident light beams with the use of an optical path assembly and a converging lens. The structural simplicity reduces the quantity of optical path devices and decreases the volume of the entire optical path control system, which in turn reduces the size of the entire optical module and thereby reduces cost. The relative positioning between the converging lens and the optical path assembly is easy to be fixed, which improves the relative precision of the focal position. The optical path assembly can employ independent designs to ensure independent control of incident light beams, and the propagation direction and focal point of each light beam can be independently controlled, thus offering a higher degree of control.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely exemplary system and module consistent with aspects related to the invention as recited in the appended claims. The scope of protection for the present disclosure covers changes made in terms of structure, method, or function by persons of ordinary skill in the art based on the exemplary embodiments.

In order to facilitate the presentation of the figures in the present disclosure, the sizes of certain structures or parts have been enlarged relative to other structures or parts. As such, they are only for the purpose of illustrating the basic structure of the subject matter of the present disclosure.

Additionally, terms in the text indicating a relative spatial position, such as "upper," "above," "lower," "below," and so forth, are used for explanatory purposes in describing the relationship between a unit or feature depicted in a drawing with another unit or feature therein. Terms indicating a relative spatial position can refer to positions other than those depicted in the figures when a device is being used or operated. For example, if the device shown in a figure is flipped over, a unit which is described as being located "below" or "under" another unit or feature will be located "above" the other unit or feature. Therefore, the exemplary term "below" can include positions both above and below. A device can be oriented in other ways (e.g., rotated 90 degrees or facing another direction), as such, descriptive spatially-related terms that appear in the text should be interpreted accordingly.

FIG. 1 is a schematic diagram showing an optical path control system structure according to a conventional technology As shown in FIG. 1, in conventional optical path control systems involving multiple parallel paths, an optical path control system 1 is used to adjust optical path spacing. The method for changing the optical path spacing and focus requires the use of multiple objective lenses 2 and multiple prisms 3. The spacing between the objective lenses 2 and the prisms 3 and the spacing between the multiple prisms 3 are relatively large. This causes the volume of the entire optical path control system 1 to be extensive, which is not conducive to the miniaturization of the optical module. In addition, the optical path control system 1 comprises a plurality of parts, the relative position of which must be controlled with precision, and the assembly process is thus relatively complex.

Figure 2:
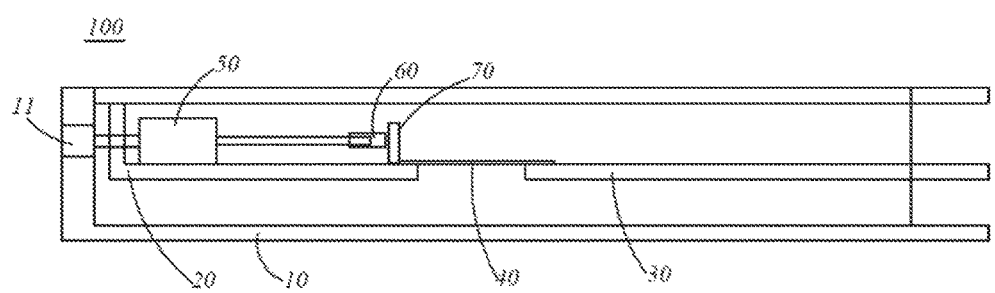
FIG. 2 is a sectional view of an optical module, according to an exemplary embodiment of the present disclosure.
Figure 3:
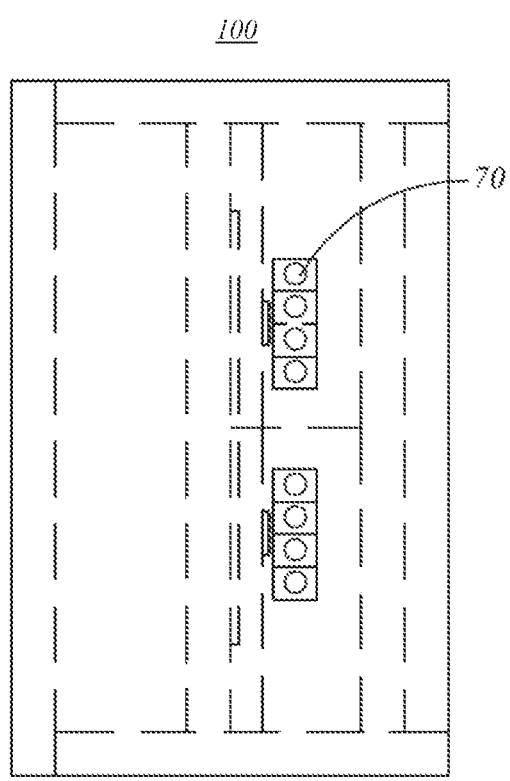
FIG. 3 is a schematic diagram showing an photoelectric receiver structure, according to an exemplary embodiment of the present disclosure.

FIGS. 2 and 3 show an optical module 100 according to an exemplary embodiment of the present disclosure. In the present embodiment, the optical module 100 comprises a case 10, an optical transceiver interface 11 for being aligned to an external device, an optical assembly (e.g., photoelectric receivers 70), a carrier plate 20 for carrying the optical assembly, a circuit board 30, and an electrical connection device 40 that connects the carrier plate 20 to the circuit board 30.

The optical assembly is packaged in the case 10 and may be a light transmitting assembly or a light receiving assembly. The case 10 may be a metal case. In some embodiments, the optical module 100 may be, for example, a transmitter optical subassembly (OSA) (TOSA), and the optical assembly may include semiconductor laser diodes (LD). In other embodiments, the optical module 100 may be a receiver OSA (ROSA), and the optical assembly may include a photoelectric detector (PD). In other embodiments, the optical module 100 may have both transmission and reception capabilities, and the optical assembly may include both semiconductor laser diodes and photoelectric detectors. The optical module 100 may be suitable for transmitting and/or receiving optical signals at different per-second data rates including, but not limited to, 1 gigabit per second (Gbit/s), 2 Gbit/s, 4 Gbit/s, 8 Gbit/s, 10 Gbit/s, 20 Gbit/s, 100 Gbit/s, or fiber-optic links of other bandwidths. In addition, the principle disclosed here may also benefit optical modules of other types and configurations or optical modules that contain elements which may differ in some respects from those shown or described herein.

The optical module 100 can receive electrical signals that carry data from a host device and transmit them to an optical fiber (not shown in FIGS. 2 and 3) in the form of data-carrying optical signals. The host device may be any system that is capable of communicating with the optical module 100.

The optical module 100 may further comprise a WDM device 50 and an optical path control system 60. The WDM device 50 and an optical path control system 60 may be located between the optical assembly and the optical transceiver interface 11. For example, when the optical assembly is a light transmitting assembly, light emitted from the light transmitting assembly is transmitted to the optical path control system 60. The WDM device 50 is used to join multiple light beams from the optical path control system 60 into a single light beam and transmit it to the optical transceiver interface 11. As another example, when the optical assembly is a light receiving assembly, the WDM device 50 is used to divide a single light beam from the optical transceiver interface 11 into multiple light beams and transmit them to the optical path control system 60, whereupon the optical path control system 60 transmits the light beams to the light receiving assembly.

Referring to FIG. 3, when the optical assembly is a light receiving assembly, the light receiving assembly comprises a plurality of photoelectric receivers 70 which are set up in an array. The spacing between the plurality of photoelectric receivers 70 is fixed; as such, in order to cause each of the light beams transmitted by the optical path control system 60 to be coupled into the plurality of photoelectric receivers 70, the light beams is controlled so that the final spacing between the light beams as they enter the photoelectric receivers 70 is equal to the spacing between the photoelectric receivers 70. There may be a difference between the initial spacing of the plurality of light beams emitted by the WDM device 50 and the required final spacing, and the spacing of the light beams may be adjusted with the aid of the optical path control system 60 located between the WDM device 50 and the photoelectric receivers 70 so that the light beams enter the plurality of photoelectric receivers 70. In addition, given the relatively small size of the light passage apertures of the photoelectric receivers 70, it is difficult for all the diverging light beams to couple into the photoelectric receivers 70. Consequently, the optical path control system 60 may facilitate the convergence of each light beam. It needs to be noted that, based on the principle of optical reversibility, the description provided above may also be referenced when the optical assembly is a light transmitting assembly.

Figure 4:
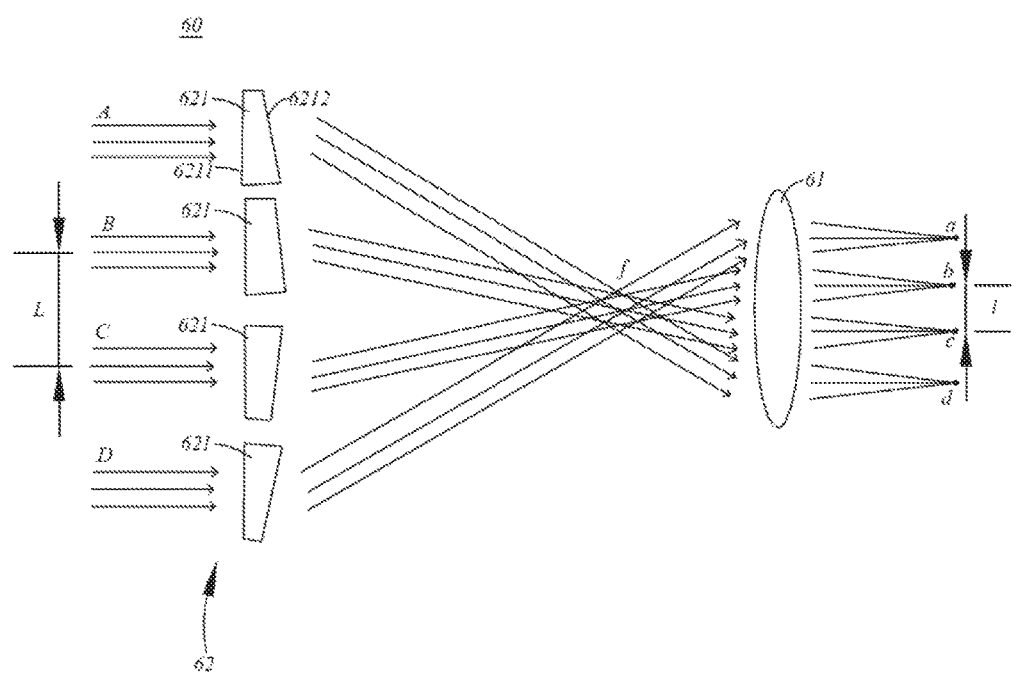
FIG. 4 is a schematic diagram showing an optical path control system, according to an exemplary embodiment of the present disclosure.

FIG. 4 is a schematic diagram showing an optical path control system 60, according to an exemplary embodiment of the present disclosure. As shown in FIG. 4, the optical path control system 60 comprises a converging lens 61 and an optical path assembly 62. The converging lens 61 is used to converge light beams which pass through the converging lens 61. The optical path assembly 62 is used to control the propagation direction of the light beams which pass through the optical path assembly 62. When a plurality of incident light beams (A, B, C, D) pass through the optical path assembly 62 and the converging lens 61 sequentially, the optical path assembly 62 converges the plurality of incident light beams (A, B, C, D), and the converging lens 61 converges each incident light beam into a point of light.

The present embodiment uses the optical path assembly 62 and the converging lens 61 to adjust the spacing of incident light beams. First, the structural simplicity reduces the quantity of optical path devices and decreases the volume of the optical path control system 60, which in turn reduces the size of the entire optical module 100 and thereby reduces cost. In addition, the relative positioning between the converging lens 61 and the optical path assembly 62 is fixed, which improves the relative precision of the focal position. Furthermore, the optical path assembly 62 can employ independent designs to ensure independent control of incident light beams, and the propagation direction and focal point of each incident light beam can be independently controlled, thus offering a higher degree of control. The optical path assembly 62 described in the present disclosure converges the plurality of incident light beams (A, B, C, D) in advance by changing the propagation directions of the light beams. This reduces the space over which the light beams propagate and the volume of the optical path control system 60.

As shown in FIG. 4, the plurality of incident light beams (A, B, C, D) converge respectively into a plurality of points of light (d, c, b, a). The points of light (a, b, c, d) do not overlap, and they correspond to the plurality of photoelectric receivers 70. The points of light (a, b, c, d) formed are located on a same line (a vertical straight line formed by connecting a, b, c and d in FIG. 4). The converging lens 61 can also convert divergent light emitted from a point light source into collimated light.

In the present embodiment, the converging lens 61 and the optical path assembly 62 can be installed together on a same support base (not shown) to fix the relative positions between the converging lens 61 and the optical path assembly 62. In some embodiments, the converging lens 61 and the optical path assembly 62 may be an integrated unit, and the space between the converging lens 61 and the optical path assembly 62 may be kept open or filled with a medium.

As shown in FIG. 4, in the present embodiment, the optical path assembly 62 of the optical path control system 60 comprises a plurality of wedge-shaped blocks 621 that are spaced apart. When light beams pass through the plurality of wedge-shaped blocks 621, the light beams change their propagation directions. Specifically, the plurality of incident light beams (A, B, C, D) change their propagation directions due to refraction that occurs at the plurality of wedge-shaped blocks 621. In the present embodiment, there is a one-to-one correspondence between the plurality of wedge-shaped blocks 621 and the incident light beams. In some embodiments, there may not be a one-to-one correspondence between the plurality of wedge-shaped blocks 621 and the incident light beams. For example, some of the incident light beams reach the converging lens 61 directly without passing through the wedge-shaped blocks 621, or multiple incident light beams enter a same wedge-shaped block 621.

In the present embodiment, the wedge-shaped blocks 621 are essentially transmission-type wedge-shaped blocks. The wedge-shaped block 621 comprises a light incident surface 6211 and a light emergent surface 6212. The incident light beams are transmitted and refracted at the wedge-shaped blocks 621. By controlling the design element of the wedge-shaped blocks 621, the relative relationship between incident light beams and the wedge-shaped blocks 621, and the relative relationship between the wedge-shaped blocks 621 and the converging lens 61, the plurality of incident light beams (A, B, C, D) can converge respectively into the plurality of non-overlapping points of light (d, c, b, a).

For example, the design elements of the wedge-shaped blocks 621 comprise: tilt angles of the light incident surface 6211 and the light emergent surface 6212 of the wedge-shaped blocks 621, positions of the wedge-shaped blocks 621, a relative positional relationship between the plurality of wedge-shaped blocks 621, a spacing between the wedge-shaped blocks 621 and the WDM device 50, etc. The relative relationship between the incident light beams and the wedge-shaped blocks 621 comprises a position of incidence of the incident light beams on the light incident surface 6211 of the wedge-shaped blocks 621, an angle of incidence of the incident light beams, etc. The relative relationship between the wedge-shaped blocks 621 and the converging lens 61 comprises a distance between the wedge-shaped blocks 621 and the converging lens 61, a size relationship of the wedge-shaped blocks 621 and the converging lens 61, a relative position of the wedge-shaped blocks 621 above, below, in front of, or behind the converging lens 61, etc. The design elements of each wedge-shaped block 621 can employ an independent design, the relative relationship of each incident light beam and the light incident surface 6211 of the corresponding wedge-shaped block 621 can employ an independent design, and the relative relationship of each wedge-shaped block 621 and the converging lens 61 can also employ an independent design. With the designs mentioned above, it is possible to effectively control the position of the point of light corresponding to each incident light beam. Thus, irrespective of the type of the incident light beam or the relationship of an incident light beam with the light incident surface 6211 of a wedge-shaped block 621, the independent design of the various parts makes it possible to effectively control the relative positions of the points of light and the photoelectric receivers 70 so that a plurality of non-overlapping points of light are respectively coupled into the corresponding photoelectric receivers 70.

Taking the four parallel incident light beams (A, B, C, D) in the present embodiment as an example, the four parallel incident light beams (A, B, C, D) each correspond to one of the four wedge-shaped blocks 621. The light incident surface 6211 and the light emergent surface 6212 of each wedge-shaped block 621 have a tilt arrangement, i.e., the angle of intersection between the incident light beam and the light incident surface 6211 and the angle of intersection between the incident light beam and the light emergent surface 6212 are not equal to 90°. In some embodiments, the light incident surface 6211 does not need to be tilted (or the light emergent surface 6212 does not need to be tilted). The initial spacing between two adjacent incident light beams is denoted by L. The four parallel incident light beams each enter the light incident surface 6211 of their respectively corresponding wedge-shaped block 621. After refraction at the light incident surface 6211 and the light emergent surface 6212 of the wedge-shaped blocks 621, the four parallel light beams converge in between the optical path assembly 62 and the converging lens 61 and then continue propagating. As shown in FIG. 4, a plurality of light beams converge at a focal point f of the converging lens 61, and the light beams pass through the converging lens 61 to form four parallel emergent light beams, which converge at the emergent end of the converging lens 61 into four points of light (a, b, c, d). The spacing between two adjacent points of light is denoted by l, i.e., l denotes the final spacing between the light beams. The final spacing l corresponds to the spacing between the plurality of photoelectric receivers 70. Thus, the light beams can successfully couple into the photoelectric receivers 70. The initial spacing between two adjacent incident light beams does not always need to be L, and the final spacing between the light beams does not always need to be l. They can be determined based on the actual situation. Herein, the emergent light beams are parallel light beams, so the four parallel emergent light beams enter the photoelectric receivers 70 at an angle perpendicular to the photoelectric receivers 70, thus achieving an optimal coupling efficiency. In some embodiments, in order to achieve optimal transmission and coupling, the center line of the whole unit comprising the four wedge-shaped blocks 621 can be aligned with the primary optical axis of the converging lens 61.

In the present embodiment, the light rays in each incident light beam are parallel. Thus, the size of the light spot from each incident light beam will not grow incrementally larger as the light beams propagate, i.e., the size of the light spot of a light beam at the light incident surface of the converging lens 61 is equal to the size of the initial light spot of the incident light beam. All the light rays in the light beams can pass through the converging lens 61 and converge, thus keeping them from occupying an excessively large area of the light incident surface of the converging lens 61 due to enlarged light spots from the light beams. Herein, the effect of optical path guidance from the wedge-shaped blocks 621 can cause incident light rays to gather after passing through the wedge-shaped blocks 621. The size of the light incident surface of the wedge-shaped blocks 621 is larger than the size of the light incident surface of the converging lens 61, such that the size of the optical path control system 60 can be further reduced. The size of the light incident surface of the wedge-shaped blocks 621 is defined as a total size of the light incident surfaces of the four wedge-shaped blocks 621 when linked together.

In some embodiments, the incident light beams (A, B, C, D) need not be parallel, e.g. the incident light beams (A, B, C, D) may be divergent light beams or convergent light beams.

Figure 5:
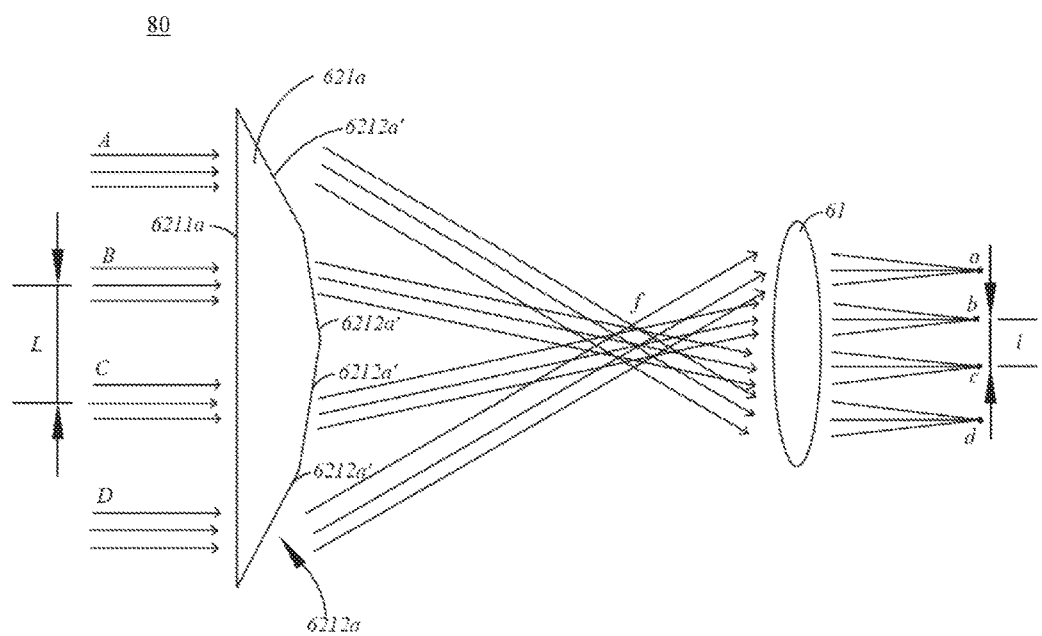
FIG. 5 is a schematic diagram showing an optical path control system, according to another exemplary embodiment of the present disclosure.

FIG. 5 shows a schematic diagram of an optical path control system 80, according to another exemplary embodiment of the present disclosure. The optical path control systems 60 and 80 apply the same labels for the same components.

In the optical path control system 80 of the present embodiment, a plurality of wedge-shaped blocks are combined to form a single integrated structure, i.e. the optical path assembly 62 is now an integrated wedge-shaped plate 621a. The plurality of incident light beams (A, B, C, D) are refracted at the wedge-shaped plate 621a and change their propagation directions. In the present embodiment, the wedge-shaped plate 621a is essentially a transmission-type wedge-shaped plate, and comprises a light incident surface 6211a and a light emergent surface 6212a. The light emergent surface 6212a comprises a plurality of connected inclined surfaces 6212a'. In some embodiments, the light incident surface 6211a may also comprise a plurality of connected inclined surfaces. The incident light beams are transmitted and refracted at the wedge-shaped plate 621a. By controlling the element design of the wedge-shaped plate 621a, the relative relationship between incident light beams and the wedge-shaped plate 621a, and the relative relationship between the wedge-shaped plate 621a and the converging lens 61, the incident light beams (A, B, C, D) can converge respectively into the plurality of non-overlapping points of light (d, c, b, a).

For example, the design elements of the wedge-shaped plate 621a comprise angles of tilt of the plurality of inclined surfaces 6212a' on the light emergent surface 6212a of the wedge-shaped plate 621a (or angles of tilt of the plurality of inclined surfaces on the light incident surface 6211a), the relative relationship among the plurality of inclined surfaces 6212a', the position of the wedge-shaped plate 621a, the spacing between the wedge-shaped plate 621a and the WDM device 50, etc. The relative relationship between incident light beams and the wedge-shaped plate 621a comprises the position of incidence of the incident light beams on the light incident surface 6211a of the wedge-shaped plate 621a, the angle of incidence of the incident light beams, etc. The relative relationship between the wedge-shaped plate 621a and the converging lens 61 comprises the spacing between the wedge-shaped plate 621a and the converging lens 61, the size relationship between the wedge-shaped plate 621a and the converging lens 61, the relative position of the wedge-shaped plate 621a above, below, in front of, or behind the converging lens 61, etc. Each of the design elements of the wedge-shaped plate 621a can employ an independent design, the relative relationship of each incident light beam and the light incident surface 6211a of the wedge-shaped plate 621a can employ an independent design, and the relative relationship of 621a and the converging lens 61 can also be selectively designed. With the designs mentioned above, it is possible to effectively control the position of the point of light corresponding to each incident light beam. Thus, irrespective of the type of the incident light beam or the relationship of an incident light beam with the light incident surface 6211a of the wedge-shaped plate 621a, the independent design of the parts makes it possible to effectively control the positions of the points of light relative to the photoelectric receivers 70 so that a plurality of non-overlapping points of light are respectively coupled into the corresponding photoelectric receivers 70.

Taking the four parallel incident light beams (A, B, C, D) in the present embodiment as an example, the light incident surface 6211a of the wedge-shaped plate 621a is flat, and the four parallel incident light beams enter the light incident surface 6211a at an angle perpendicular to the light incident surface 6211a. The light emergent surface 6212a of the wedge-shaped plate 621a comprises four inclined surfaces 6212a', and the four inclined surfaces 6212a' are not coplanar. The initial spacing between two adjacent incident light beams is denoted by L. After refraction at the light emergent surface 6212a of the wedge-shaped plate 621a, the plurality of light beams converge in between the wedge-shaped plate 621a and the converging lens 61, and then continue propagating. As shown in FIG. 5, the plurality of light beams converge at focal point f of the converging lens 61, and the light beams pass through the converging lens 61 to form four parallel emergent light beams, which converge at the emergent end of the converging lens 61 into four points of light (a, b, c, d). The spacing between two adjacent points of light is denoted by l, i.e., l denotes the final spacing between the light beams, and the final spacing l corresponds to the spacing between the plurality of photoelectric receivers 70. Thus, the light beams can successfully couple into the photoelectric receivers 70. The initial spacing between two adjacent incident light beams does not always need to be L, and the final spacing between the light beams does not always need to be l. They can be determined based on the actual situation. Herein, the emergent light beams are parallel light beams, so the four parallel emergent light beams enter the photoelectric receivers 70 at an angle perpendicular to the photoelectric receivers 70, thus achieving an optimal coupling efficiency. In some embodiments, in order to achieve optimal transmission and coupling, the center line of the wedge-shaped plate 621a can be aligned with the primary optical axis of the converging lens 61.

In the present embodiment, the light rays in every incident light beam are parallel. Thus, the size of the light spot from each incident light beam will not grow incrementally larger as the light beams propagate, i.e., the size of the light spot from a light beam at the light incident surface of the converging lens 61 is equal to the size of the initial light spot from the incident light beam. All the light rays in the light beams can pass through the converging lens 61 and converge, thus keeping them from occupying an excessively large area of the light incident surface of the converging lens 61 due to enlarged light spots from the light beams. Herein, the effect of optical path guidance from the wedge-shaped plate 621a can cause incident light rays to gather after passing through the wedge-shaped plate 621a. The size of the light incident surface of the wedge-shaped plate 621a is larger than the size of the light incident surface of the converging lens 61. In some embodiments the size of the optical path control system 80 can be further reduced.

It needs to be noted that, in some embodiments, the incident light beams (A, B, C, D) need not be parallel, e.g., the incident light beams (A, B, C, D) may be divergent light beams or convergent light beams.

In summary, the present embodiment uses the guidance effect of the optical path assembly 62 and the convergence effect of the converging lens 61 to couple incident light beams into the photoelectric receivers 70. Thus, the optical path control system can achieve light beam convergence while at the same time enabling control of the direction and spacing of light beams, thereby offering an improved integration performance. Second, only an optical path assembly 62 and a converging lens 61 need to be provided in this disclosure, and the spacing between the two does not need to be very large. The structural simplicity reduces the quantity of optical path devices and decreases the volume of the optical path control system 80, which in turn reduces the size of the entire optical module 100 and thereby reduces cost. Third, the relative positioning between the converging lens 61 and the optical path assembly 62 is fixed, which improves the relative precision of the focal position. Furthermore, the optical path assembly 62 can each employ an independent design to ensure independent control of incident light beams, and the propagation direction and focal point of each incident light beam can be independently controlled, thus offering a higher degree of control. In addition, the final emergent light beams enter the photoelectric receivers 70 at an angle perpendicular to the photoelectric receivers 70, thus making it possible to achieve an optimal coupling efficiency.

Other embodiments of the invention will be apparent to those skilled in the art from consideration of the specification and practice of the invention disclosed here. The illustrated steps are set out to explain the exemplary embodiments shown, and it should be anticipated that ongoing technological development will change the manner in which particular functions are performed. These examples are presented herein for purposes of illustration, and not limitation. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. An optical path control system, comprising:
   a converging lens used to converge a plurality of light beams passing through the converging lens; and
   an optical path assembly used to control propagation directions of the plurality of light beams passing through the optical path assembly,
   wherein when the plurality of light beams pass through the optical path assembly and the converging lens sequentially, the optical path assembly converges the plurality of light beams, and the converging lens converges each of the plurality of light beam into a point of light,
   wherein the converging lens converges the plurality of light beams into a plurality of points of light, the plurality of points of light being non-overlapping, each respective point of light being received by a respective photoelectric receiver.

2. The optical path control system according to claim 1, wherein the optical path assembly comprises a plurality of wedge-shaped blocks, and the plurality of light beams change their propagation directions when the plurality of light beams pass through the plurality of wedge-shaped blocks.

3. The optical path control system according to claim 2, wherein the plurality of wedge-shaped blocks are combined to form a single integrated structure.

4. The optical path control system according to claim 3, wherein the single integrated structure and the converging lens each includes a light incident surface, and a size of the light incident surface of the single integrated structure is larger than a size of the light incident surface of the converging lens.

5. The optical path control system according to claim 2, wherein each of the plurality of wedge-shaped blocks includes a light incident surface and a light emergent surface, the light incident surface and the light emergent surface of each wedge-shaped block are tilted.

6. The optical path control system according to claim 1, wherein the optical path assembly causes the plurality of light beams to converge at a point between the optical path assembly and the converging lens.

7. The optical path control system according to claim 1, wherein the plurality of light beams that are projected toward the optical path assembly are parallel.

8. The optical path control system according to claim 7, wherein light rays in each of the plurality of light beams are parallel.

9. The optical path control system according to claim 8, wherein the optical path assembly converges the plurality of light beams at a focal point of the converging lens.

10. An optical module, comprising:
a case;
an optical transceiver interface aligned to an external device;
an optical assembly located in the case; and
an optical path control system located between the optical assembly and the optical transceiver interface,
wherein the optical path control system comprises:
a converging lens used to converge a plurality of light beams passing through the converging lens; and
an optical path assembly used to control propagation directions of the plurality of light beams passing through the optical path assembly,
wherein when the plurality of light beams pass through the optical path assembly and the converging lens sequentially, the optical path assembly converges the plurality of light beams, and the converging lens converges each of the plurality of light beam into a point of light.

11. The optical module according to claim 10, wherein the optical assembly is a light transmitting assembly or a light receiving assembly.

12. The optical module according to claim 10, further comprising a wavelength division multiplexing (WDM) device positioned between the optical transceiver interface and the optical path control system,
wherein the WDM device is used to join a first plurality of light beams from the optical path control system into a first single light beam and transmit the first single light beam to the optical transceiver interface, or used to divide a second single light beam from the optical transceiver interface into a second plurality of light beams and transmit the second plurality of light beams to the optical path control system.

13. The optical module according to claim 10, wherein the optical path assembly comprises a plurality of wedge-shaped blocks, and the plurality of light beams change their propagation directions when the plurality of light beams pass through the plurality of wedge-shaped blocks.

14. The optical module according to claim 13, wherein the plurality of wedge-shaped blocks are combined to form a single integrated structure.

15. The optical module of claim 10, wherein the optical path assembly causes the plurality of light beams to converge at a point between the optical path assembly and the converging lens.

16. The optical module according to claim 10, wherein the plurality of light beams that are projected toward the optical path assembly are parallel.

17. The optical module according to claim 16, wherein light rays in each of the plurality of light beams are parallel.

18. The optical module according to claim 17, wherein the optical path assembly converges the plurality of light beams at a focal point of the converging lens.

19. The optical module according to claim 10, wherein the converging lens converges the plurality of light beams into a plurality of points of light, the plurality of points of light being non-overlapping.

20. An optical path control system, comprising:
a converging lens used to converge a plurality of light beams passing through the converging lens; and
an optical path assembly used to control propagation directions of the plurality of light beams passing through the optical path assembly,
wherein when the plurality of light beams pass through the optical path assembly and the converging lens sequentially, the optical path assembly converges the plurality of light beams, and the converging lens converges each of the plurality of light beam into a point of light,
wherein the optical path assembly causes the plurality of light beams to converge at a point between the optical path assembly and the converging lens.

* * * * *